(12) United States Patent
Cole et al.

(10) Patent No.: US 10,877,176 B2
(45) Date of Patent: Dec. 29, 2020

(54) AIRBORNE LOCATOR OF AN UNDERGROUND OBJECT

(71) Applicant: The Charles Machine Works, Inc., Perry, OK (US)

(72) Inventors: Scott B. Cole, Edmond, OK (US); Brian K. Bailey, Stillwater, OK (US); Larry G. Morse, Perry, OK (US)

(73) Assignee: The Charles Machine Works, Inc., Perry, OK (US)

( * ) Notice: Subject to any disclaimer, the term of this patent is extended or adjusted under 35 U.S.C. 154(b) by 0 days.

(21) Appl. No.: 16/661,548

(22) Filed: Oct. 23, 2019

(65) Prior Publication Data

US 2020/0088903 A1    Mar. 19, 2020

Related U.S. Application Data

(63) Continuation-in-part of application No. 15/603,719, filed on May 24, 2017, now Pat. No. 10,459,105, which is a continuation-in-part of application No. 14/802,500, filed on Jul. 17, 2015, now abandoned.

(60) Provisional application No. 62/025,543, filed on Jul. 17, 2014.

(51) Int. Cl.
| | |
|---|---|
| *G01V 3/16* | (2006.01) |
| *G01V 3/165* | (2006.01) |
| *E21B 7/04* | (2006.01) |
| *B64C 39/02* | (2006.01) |
| *E21B 47/024* | (2006.01) |
| *E21B 47/092* | (2012.01) |

(52) U.S. Cl.
CPC ............. *G01V 3/16* (2013.01); *B64C 39/024* (2013.01); *E21B 7/046* (2013.01); *E21B 47/024* (2013.01); *E21B 47/092* (2020.05); *G01V 3/165* (2013.01); *B64C 2201/12* (2013.01)

(58) Field of Classification Search
CPC ...................... G01V 3/16; G01V 3/165; H01L 2924/00014; H01L 2224/37147; H01L 2924/00; H01L 43/08; H01L 2224/291; H01L 2224/37599; H01L 2224/45014; H01L 43/12
See application file for complete search history.

(56) References Cited

U.S. PATENT DOCUMENTS

| | | | |
|---|---|---|---|
| 4,812,812 A * | 3/1989 | Flowerdew | G01B 7/003 340/853.6 |
| 5,264,795 A | 11/1993 | Rider | |
| 6,268,731 B1 | 7/2001 | Hopwood et al. | |
| 6,868,314 B1 | 3/2005 | Frink | |
| 7,111,693 B1 | 9/2006 | Self et al. | |

(Continued)

*Primary Examiner* — Jermele M Hollington
*Assistant Examiner* — Taqi R Nasir
(74) *Attorney, Agent, or Firm* — Tomlinson McKinstry, P.C.

(57) ABSTRACT

A system for tracking a below-ground transmitter from an aerial receiver. The receiver has an antenna assembly, a processor, and a propulsion system. The antenna assembly detects the magnetic field from an underground transmitter and generates an antenna signal. The processor is programmed to receive the antenna signal and generate a command signal, which moves the receiver to a position above the transmitter. Once in the desired position, which may be a reference plane at a fixed elevation, the antenna assembly measures the magnetic field to determine the location of the drill bit along borepath.

19 Claims, 9 Drawing Sheets

(56) References Cited

U.S. PATENT DOCUMENTS

| | | | |
|---|---|---|---|
| 7,231,320 B2 * | 6/2007 | Papadimitriou | G05B 19/41875 |
| | | | 702/185 |
| 7,350,594 B2 | 4/2008 | Cole et al. | |
| 7,647,987 B2 | 1/2010 | Cole | |
| 7,786,731 B2 | 8/2010 | Cole et al. | |
| 8,018,382 B2 | 9/2011 | Shore et al. | |
| 8,072,220 B2 | 12/2011 | Dolgin et al. | |
| 8,497,684 B2 | 7/2013 | Cole et al. | |
| 9,329,297 B2 | 5/2016 | Cole et al. | |
| 9,527,588 B1 * | 12/2016 | Rollefstad | B64C 39/024 |
| 9,547,101 B2 | 1/2017 | Cole et al. | |
| 2002/0020559 A1 * | 2/2002 | Barbera | E21B 7/04 |
| | | | 175/19 |
| 2002/0116129 A1 * | 8/2002 | Alft | E21B 44/00 |
| | | | 702/9 |
| 2010/0001731 A1 * | 1/2010 | Royle | G01V 3/081 |
| | | | 324/326 |
| 2012/0146648 A1 | 6/2012 | Eick et al. | |
| 2014/0111211 A1 * | 4/2014 | Cole | G01V 3/30 |
| | | | 324/346 |
| 2014/0163775 A1 | 6/2014 | Metzler | |
| 2014/0303814 A1 | 10/2014 | Burema et al. | |
| 2016/0018551 A1 | 1/2016 | Cole et al. | |
| 2016/0117932 A1 * | 4/2016 | Park | G05D 1/0202 |
| | | | 701/3 |
| 2016/0356146 A1 | 12/2016 | Gard et al. | |

\* cited by examiner

AIRBORNE LOCATOR OF AN UNDERGROUND OBJECT

FIELD

The present invention relates generally to the locating of drill bit position during horizontal directional drilling and other excavation operations and specifically to the use of a drone to track progress of a borehole.

SUMMARY

The invention is directed to a system for tracking a drill bit. The system comprises a drill rig, a drill string, a downhole tool, a drill bit, a dipole magnetic field transmitter, and a self-propelled autonomous receiver. The drill string has a first end and a second end. The first end is operatively connected to the drill rig. The downhole tool is connected to the second end of the drill string. The dipole magnetic field transmitter is supported by the downhole tool. A dipole magnetic field is emitted from the downhole tool at an underground location. The drill bit is connected to the downhole tool. The receiver comprises an antenna and a processor. The antenna detects the dipole magnetic field. The processor is configured to perform a method. The method comprises the steps of maintaining the autonomous receiver in a reference plane above the ground, receiving a signal indicative of the field detected by the antenna, determining a direction of a null within the dipole magnetic field, and directing the autonomous receiver to move along the reference plane to the null point.

In another embodiment, the invention is directed to a method. The method comprises transmitting a dipole magnetic field from a transmitter at an underground location and engaging a propulsion system to lift an autonomous receiver into the air to a predetermined reference elevation. The method also comprises detecting the dipole magnetic field at the reference elevation using an antenna assembly disposed on the autonomous receiver, and moving the receiver with the propulsion system to a position above the transmitter and at a front null point of the magnetic field using the detected magnetic field, while keeping the receiver at the predetermined reference elevation. Thereafter, the signal strength of the magnetic field and the orientation of the magnetic field in three dimensions is measured using the antenna assembly with the receiver at the null point to determine a vertical distance between the transmitter and the receiver. The altitude of the receiver above a ground surface is detected. Thereafter, an actual depth of the underground location is determined using the altitude and the vertical distance.

In yet another embodiment, the invention is directed to a system comprising a signal transmitter and a self-propelled autonomous receiver. The transmitter is disposed at an underground location and generates a dipole magnetic field from the underground location. The receiver comprises an antenna assembly, a processor, and a propulsion system. The antenna assembly detects the magnetic field and generates an antenna signal. The processor receives the antenna signal and generates a command signal. The propulsion system receives the command signal and moves the receiver to a position above the transmitter and at a front null point of the magnetic field using the detected magnetic field while keeping the receiver at a predetermined reference elevation.

DETAILED DESCRIPTION

The horizontal directional drilling (HDD) industry traditionally uses walk-over tracking techniques to follow the progress of a bore, to find the surface location immediately above the drill bit, and to determine the depth of the drill bit from that surface location. The primary tracking tools are a subsurface transmitter and a hand-carried surface receiver. The transmitter, located in or very near a cutting tool, generally emits a magnetic dipole field created by a single coil dipole antenna. The transmitted dipole field can be used for both location and communication with the above ground receiver. Hand-held receivers are very useful and are appropriate in most drilling operations because the operator can walk along the borepath to track the cutting tool. However, from time-to-time obstructions or restrictions may prevent an operator from walking along the entire borepath. Thus, there remains a need for receivers that are capable of locating a cutting tool when the operator is not able to position himself and the receiver over the cutting tool.

In the same way, locating an existing underground utility is a critical part of preparing to bore in the subsurface. Thus, a receiver may be provided with a locating antenna on board to detect a field generated about an underground utility, such as a wireline or pipeline. Mapping the depth and path of such underground utilities, without regard to obstructions located on the surface, is advantageous.

Figure 1:
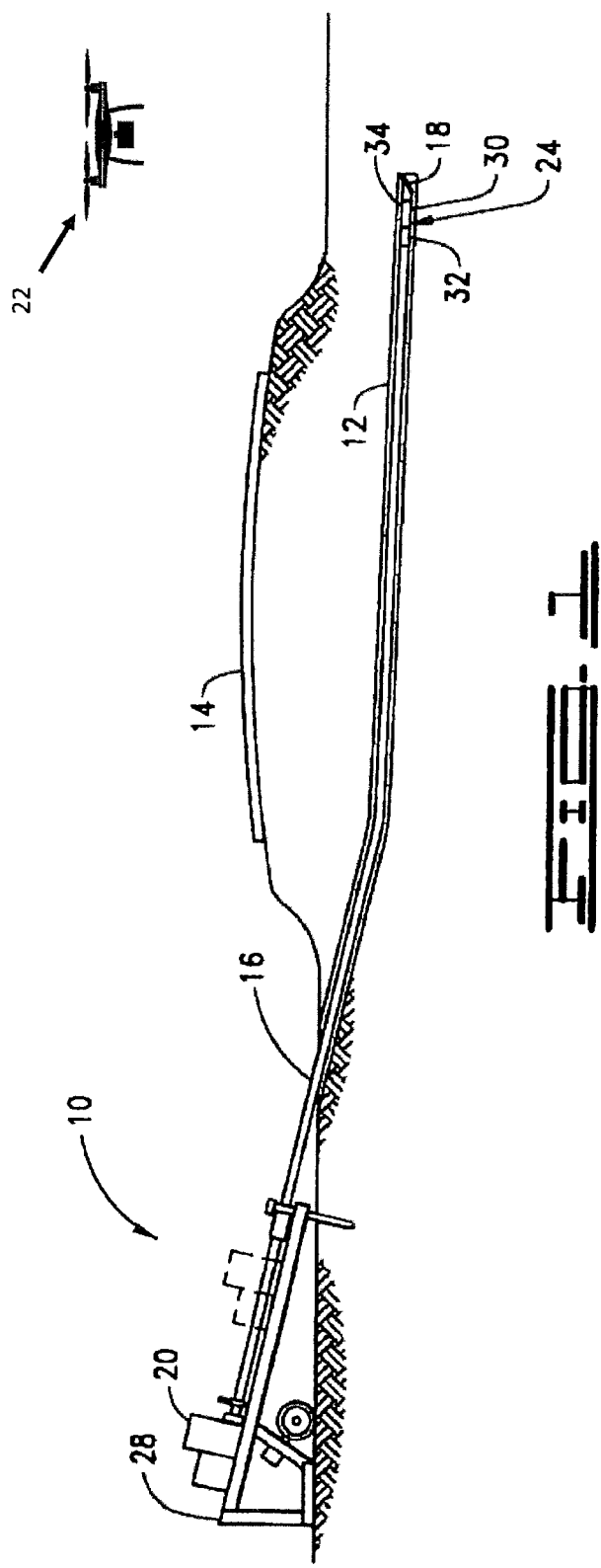
FIG. 1 is an overall plan view of a horizontal directional drilling operation using a tracker of the present invention.

With reference now to the drawings in general and FIG. 1 in particular, there is shown therein an "HDD" system 10 for use with the present invention. FIG. 1 illustrates the usefulness of HDD by demonstrating that a borehole 12 can be made without disturbing an above-ground structure, namely a roadway or walkway as denoted by reference numeral 14. To cut or drill the borehole 12, a drill string 16 carrying a cutting tool such as a drill bit 18 is rotationally driven by a rotary drive system 20. When the HDD system 10 is used for drilling a borehole 12, monitoring the position of the drill bit 18 is critical to accurate placement of the borehole and subsequently installed utilities. The present invention is also useful in tracking the progress of a cutting tool such as a backreamer used to enlarge a borehole. The present invention is directed to a system 22 and method for tracking and monitoring a downhole tool 24 during an HDD operation.

The HDD system 10 of the present invention is suitable for near-horizontal subsurface placement of utility services, for example under the roadway 14, building, river, or other obstacle.

The tracking system 22 for use with the HDD system 10 is an airborne self-propelled autonomous receiver particularly suited for providing an accurate three-dimensional locate of the downhole tool assembly 24 from above ground. The locating and monitoring operation with the present receiver system 22 is advantageous in that it may be accomplished in a single operation that does not require the operator to stand on the borepath or above the downhole tool. The present invention also permits the position of the downhole tool assembly 24 to be monitored without requiring the tracking system 22 be placed directly over a transmitter in the downhole tool assembly. These and other advantages associated with the present invention will become apparent from the following description of the preferred embodiments.

With continued reference to FIG. 1, the HDD system 10 comprises the drill rig 28 having a rotary drive system 20 operatively connected to the first end of the drill string 16. The downhole tool 24 is connected to the second end of the drill string 16. The downhole tool 24 preferably comprises an electronics package 30 and has a cutting tool such as a slant-faced drill bit 18 connected to its downhole end. In a preferred embodiment the transmitter is supported within a housing of the downhole tool 24. However, an alternative transmitter as disclosed in co-pending U.S. patent application Ser. No. 14/733,340 may be used without departing from the spirit of the present invention. The electronics package 30 comprises a transmitter 32 for emitting a signal through the ground. Preferably the transmitter 32 is supported by the downhole tool 24 and comprises a dipole antenna that emits a dipole magnetic field. The electronics package 30 may also comprise a plurality of sensors 34 for detecting operational characteristics of the downhole tool 24 and the drill bit 18. The plurality of sensors 34 may generally comprise sensors such as a roll sensor to sense the roll position of the drill bit 18, a pitch sensor to sense the pitch of the drill bit, a temperature sensor to sense the temperature in the electronics package 30, and a voltage sensor to indicate battery status. The information detected by the plurality of sensors 34 is preferably communicated from the downhole tool assembly 24 on the signal transmitted by the transmitter 32 using modulation or other known techniques.

Figure 2:
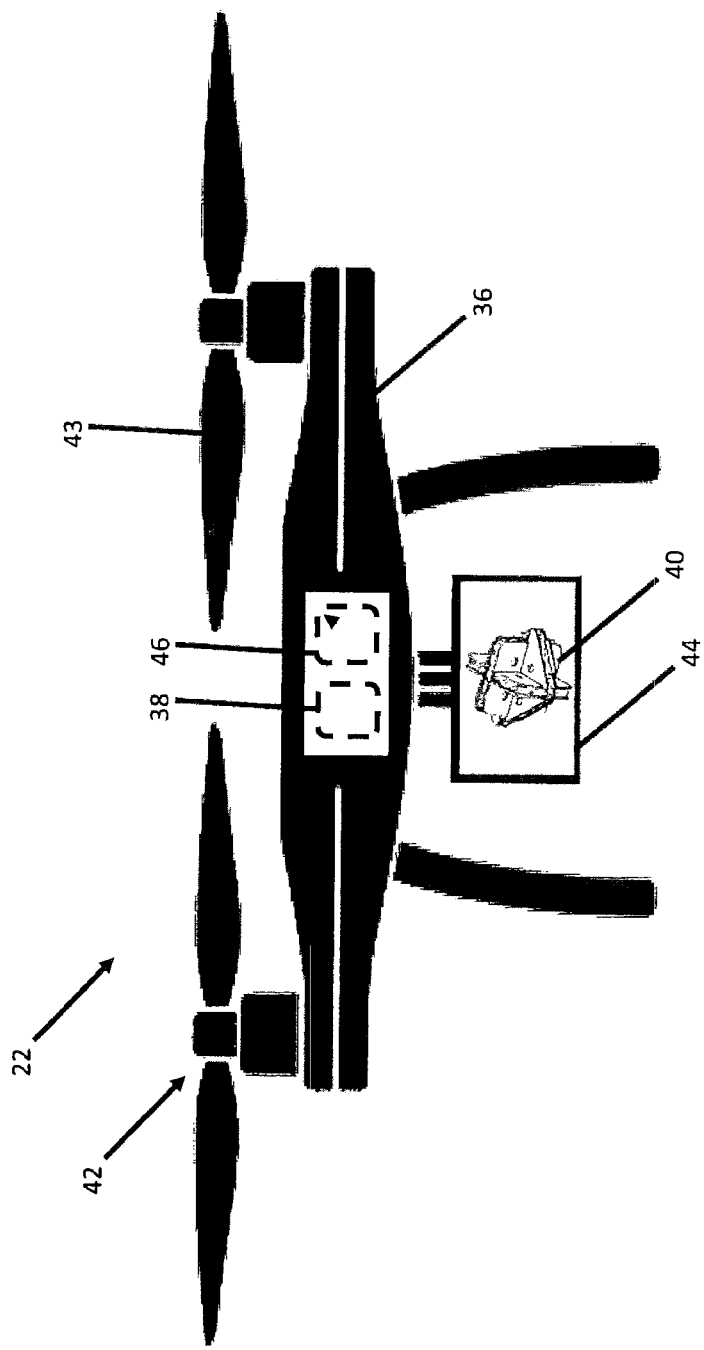
FIG. 2 is a diagrammatic representation of the tracker of FIG. 1.

With reference now to FIG. 2, shown therein is a preferred embodiment of the tracking system, or receiver 22 of the present invention. The receiver 22 comprises a frame 36, a computer processor 38, and an antenna assembly 40 supported by the frame. The processor 38 is supported on the frame 36 and operatively connected to the antenna assembly 40. The frame 36 is preferably of lightweight construction and capable of being lifted and maneuvered with a propulsion system 42 supported by the frame and operatively connected to the processor 38. The propulsion system 42 may comprise one or more rotors 43 used to lift the frame into the air. The receiver shown in FIG. 2 comprises a quadcopter having a housing 44 for supporting the antenna assembly 40. While a quadcopter is shown to illustrate the usefulness of the present invention, one skilled in the art will appreciate any remotely controlled or autonomous aircraft capable of lifting, hovering, landing, and moving the antenna assembly will be an acceptable vehicle for moving the antenna assembly.

The antenna assembly 40 is supported on the frame 36 and is preferably adapted to measure the total magnetic field emitted by the dipole transmitter 32. The antenna assembly 40 may comprise three mutually orthogonal antennas which measure the magnetic field along their specific axis of sensitivity. Each of the three orthogonal antenna signals is squared, summed, and then the square root is taken to obtain the total field. This calculation assumes the sensitivities of each antenna are the same and that the center of each antenna is coincident with the other two such that the antenna arrangement is measuring the total field at a single point in space. As shown in FIG. 2 the tri-axial antenna may comprise three antenna coils wound around a frame in channels formed in a support structure. The structure and function of such an antenna is described more fully U.S. Pat. No. 7,786,731, issued to Cole et al., the contents of which are fully incorporated herein. While wound antenna coils are shown in FIG. 2, one skilled in the art will appreciate that printed circuit board antennas like those disclosed in co-pending U.S. patent application Ser. No. 14/750,553, or traditional ferrite rod antennas may be used without departing from the spirit of the invention. Additionally, more than one antenna assembly 40 may be supported by the frame as disclosed in U.S. patent application Ser. No. 14/137,379, the contents of which are incorporated fully herein by this reference.

A processor 38 may be supported on the frame and programmed to determine a distance between the antenna assembly 40 and the transmitter 32 (FIG. 1) based on the signal strength and magnetic field orientation measurements taken by the antenna assembly. Alternatively, the processor 38 may be replaced by a communication system adapted to transmit the measurements taken by the antenna assembly 40 to a processor disposed at a location remote from the receiver 22 such as at drill rig 28. Such an arrangement may be preferable if the weight of the receiver components supported by the frame is of a concern.

An altimeter 46 may be supported by the frame 36 and used to determine an altitude (height above ground level) of the frame. The altimeter 46 may comprise a traditional altimeter or ultrasonic or Ultra Wide Band (UWB) sensors. Alternatively, a global positioning system may be used to determine the position and altitude of the receiver. Knowing the altitude of the frame 36, and thus the antenna assembly 40, is important for determining the depth of the transmitter 32 (FIG. 1) below ground. The depth of the transmitter 32 is determined using the altitude of the receiver and the distance between the antenna assembly 40 and the transmitter. In other words, when the antenna assembly 40 is directly over the transmitter 32 the altitude is subtracted from the distance between the receiver 22 and the transmitter to determine a depth of the transmitter. This function is preferably performed by the processor 38 and communicated to a hand-held remote display (not shown) or via a remote display (not shown) at the drill rig 28.

The processor 38 is programmed to transmit a command signal to the propulsion system 42. The command signal instructs the propulsion system 42 and causes the receiver 22 to move to a position above the transmitter 32. The command signal may direct the frame to move to a null point of the magnetic field above and in front of the transmitter 32 in a manner yet to be described.

Figure 3:
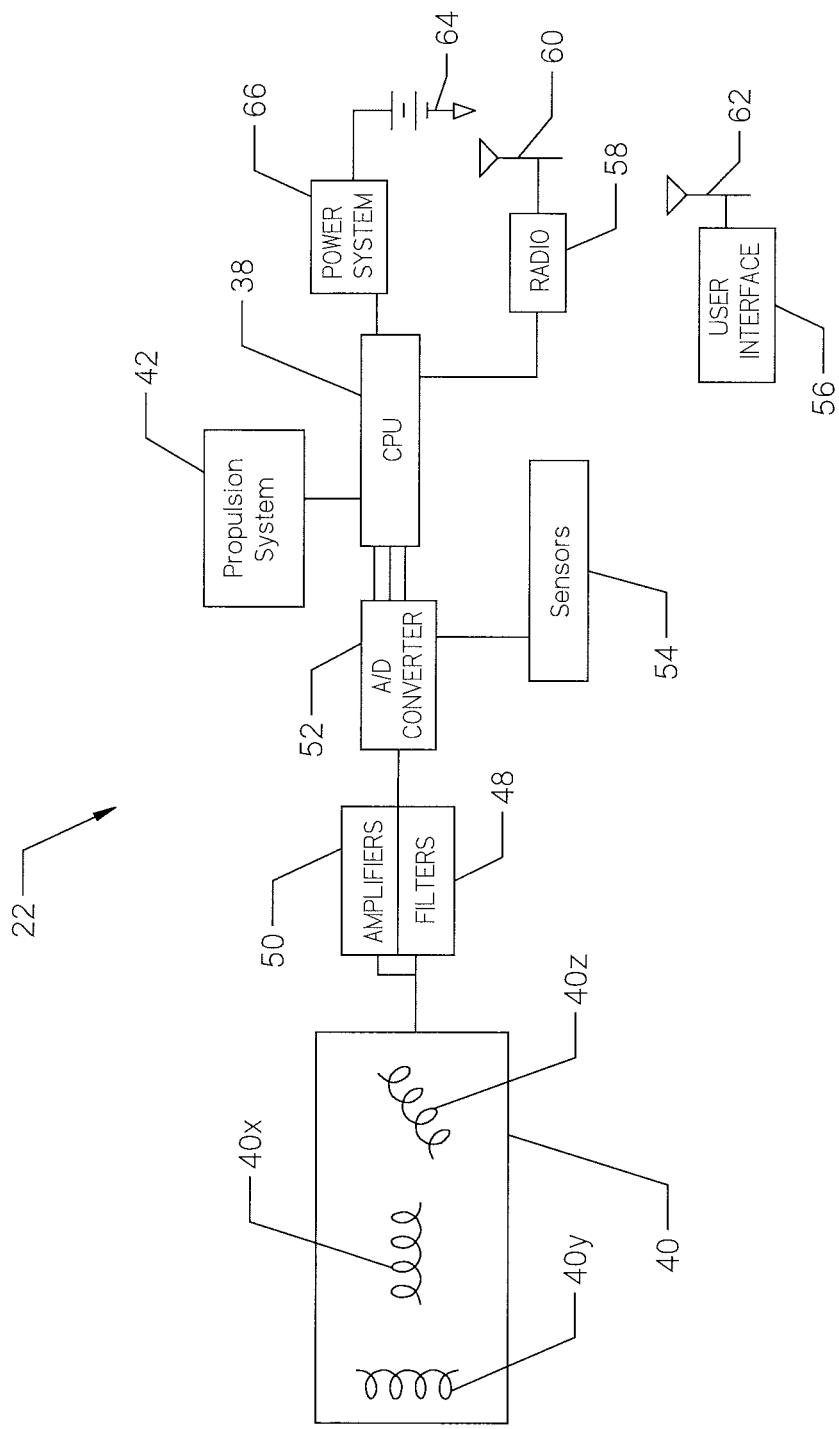
FIG. 3 is a block diagram of a tracker constructed to detect and process magnetic field signals from a transmitter.

With reference now to FIG. 3, shown therein is a block diagram of the preferred embodiment of the receiver 22 of the present invention. The antenna assembly 40, as described earlier, measures changes in the magnetic field. A change sensed in the magnetic field will result in a voltage being induced in response to the transmitter's 32 magnetic field. The voltages from the antennas 40$x$, 40$y$, and 40$z$ are sent to filter 48 and amplifier 50. Filter 48 eliminates the effects of other signals received by the antennas 40 from local noise sources. Amplifier 50 increases the signal received by the antennas 40*x*, 40*y*, and 40*z*. An A/D converter 52 is used to convert analog waveform information into digital data.

The digital data from the A/D converter 52 is then sent to the central processor 38 (CPU) to calculate the location of the transmitter 32 (FIG. 1) relative to the receiver 22. The CPU 38 may comprise a digital signal processor (DSP) and a microcontroller. The CPU 38 decodes the information from the A/D converter 52 and performs calculations to determine the location of the transmitter 32. The CPU 38 may also discern information transmitted on the magnetic field, to determine the battery status, pitch, roll, and other information about the downhole tool assembly 24.

The receiver 22 may comprise one or more sensors 54 used to sense operational information about the receiver 22. For example, the altimeter 46 (FIG. 2), one or more accelerometers, or other known inclination and orientation sensors or magnetic compasses, may provide information concerning the roll or tilt of the receiver 22. An orientation sensor may be used to determine an orientation of the frame 36 relative to a reference orientation. Commonly, the reference orientation would comprise the frame disposed in a level orientation relative to the horizon. Information from the sensors 54 is provided to the A/D converter 52 and to the CPU 38 where the DSP may make calculations to compensate for the receiver 22 not being level.

In the preferred embodiment a user interface 56 having a plurality of buttons, joysticks, and other input devices may be used to control the receiver 22. The operator can input information for use by the CPU 38 through the user interface 56. Information entered through the user interface 56 or determined or used by the CPU 38 may be displayed to the operator on a visual display (not shown) screen at the receiver 22. The receiver 22 also comprises a radio 58 having an antenna 60 for transmitting information from the CPU 38 to the remote user interface 56 via antenna 62, such as at the drilling machine 10.

The receiver 22 is preferably powered by a battery assembly 64 and power regulation system 66. The battery assembly 64 may comprise rechargeable batteries. The power regulation system 66 may comprise a linear regulator or switch mode regulator to provide power to the various components of the receiver 22.

The processor 38 receives the magnetic field measurements taken by antennas 40*x*, 40*y*, and 40*z* and processes them as disclosed in U.S. Pat. No. 7,786,731 to determine the location of the transmitter 32 or alternatively to direct the receiver 22 to the transmitter. However, instead of translating the inputs into directional indicators used to direct the operator to certain points in the magnetic field, the processor 38 issues command signals that direct the propulsion system 42 to move the receiver 22 in a desired direction. The processor 38 may directly interface with the propulsion system 42 controls or it may transmit the antenna signals received from the antenna assembly 40 to a remote processor via a wireless communication link adapted to control movement and position of the tracking receiver 22. Use of a processor remote from the tracking receiver 22 will reduce the weight of the receiver and reduce power consumption from the batteries 64.

Figure 4:
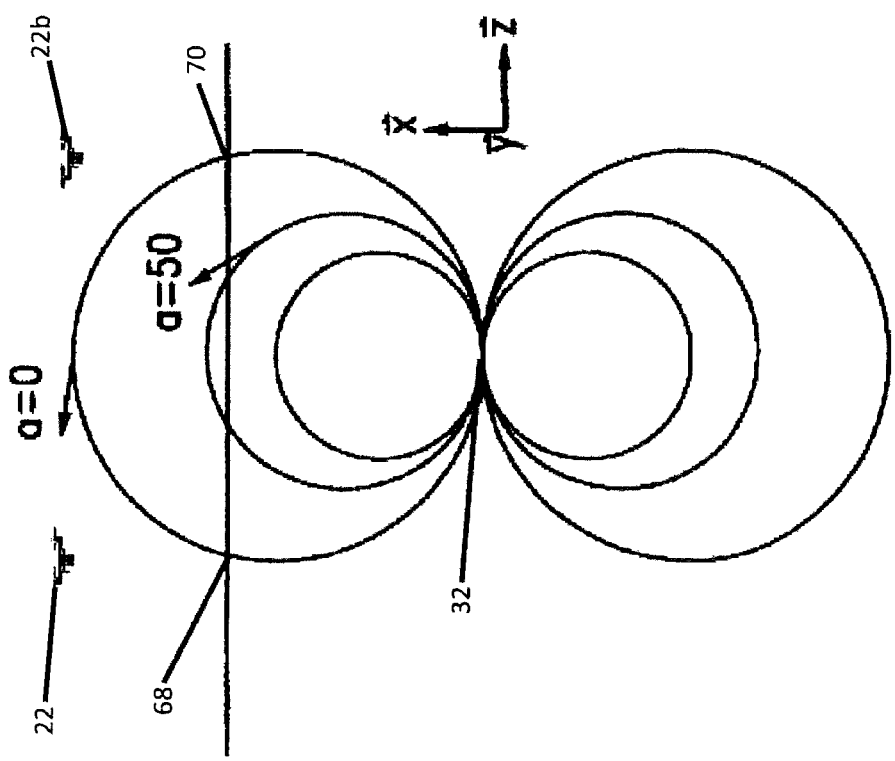
FIG. 4 is an illustration of flux lines radiating from a transmitter, as depicted in the x-y plane.

Referring now to FIG. 4, there is shown therein a graphical depiction of flux lines radiating from the transmitter 32 in the x-z plane. Assuming the pitch of the receiver 22 is 0, note that the angle $\alpha \Rightarrow 0$ as $z \Rightarrow 0$. The processor 38 detects this angle and commands the propulsion system 42 to move the receiver 22 until it is located above a front null point 68 (a point wherein the magnetic field is completely vertical).

Using the antenna assembly 40 the front null point 68 is easily determined by detecting a signal strength measurement of zero with antenna 40*y*. At this point, the receiver 22 will be located on the borepath above and in front of the transmitter 32. Field strength measurements may be taken at the front null point 68 with the 40*x* and 40*z* antennas to determine the direct distance to the transmitter 32. Using the direct distance and the distance between the receiver 22 and the ground, the depth of the transmitter 32 can be determined.

With the present invention, improved methods for directing and drilling a horizontal directional borehole 12 are also possible. For example, a receiver having an antenna assembly for detecting the dipole magnetic field in three dimensions and a propulsion system to lift the receiver off the ground is provided. The dipole magnetic field is transmitted from the transmitter 32 and the propulsion system is engaged to lift the receiver 22 into the air. The antenna assembly 40 continuously detects the magnetic field. Signal strength and field orientation measurements taken by the antenna assembly 40 are used by the processor 38 to determine a location of the receiver 22 within the magnetic field and to direct the receiver to a position above the transmitter 32 that is within a cone having a vertex at the transmitter, a vertical axis, and boundaries defined by the front and back null points. At the front null point 68 the processor 38 may take measurements of the signal strength of the field to determine a location, including the depth, of the transmitter 32. Measurements may be taken with the receiver 22 hovering above the ground. Alternatively, the receiver 22 may land to take field strength measurements and then take-off to move to a new location. Landing to measure the magnetic field may be advantageous to reduce noise effect from the propulsion system 42 when locating the transmitter 32 or to steady the receiver 22 if high winds are present.

In an improved method of tracking the downhole tool, the transmitter 32 may be moved along the desired borepath and the receiver 22 may be programmed to automatically move with the transmitter to maintain its position at the front null point 68 and provide periodic depth and location measurements as the boring operation advances.

A second receiver 22*b* may also be utilized in concert with the receiver 22 to track the downhole tool as it progresses along the borepath. In such system, the second receiver 22*b* may be programmed to find and position itself at a back null point 70 with the receiver 22 positioned at the front null point 68. Onboard sensors or GPS may be used to determine the direct distance between the receiver 22 and second receiver 22*b*. With the receivers 22, 22*b* positioned at the null points 68 and 70 the processer may determine the depth of the transmitter 32 which is equal to the distance between the receivers divided by the square root of 2 (assuming the pitch of both is zero).

Figure 8:
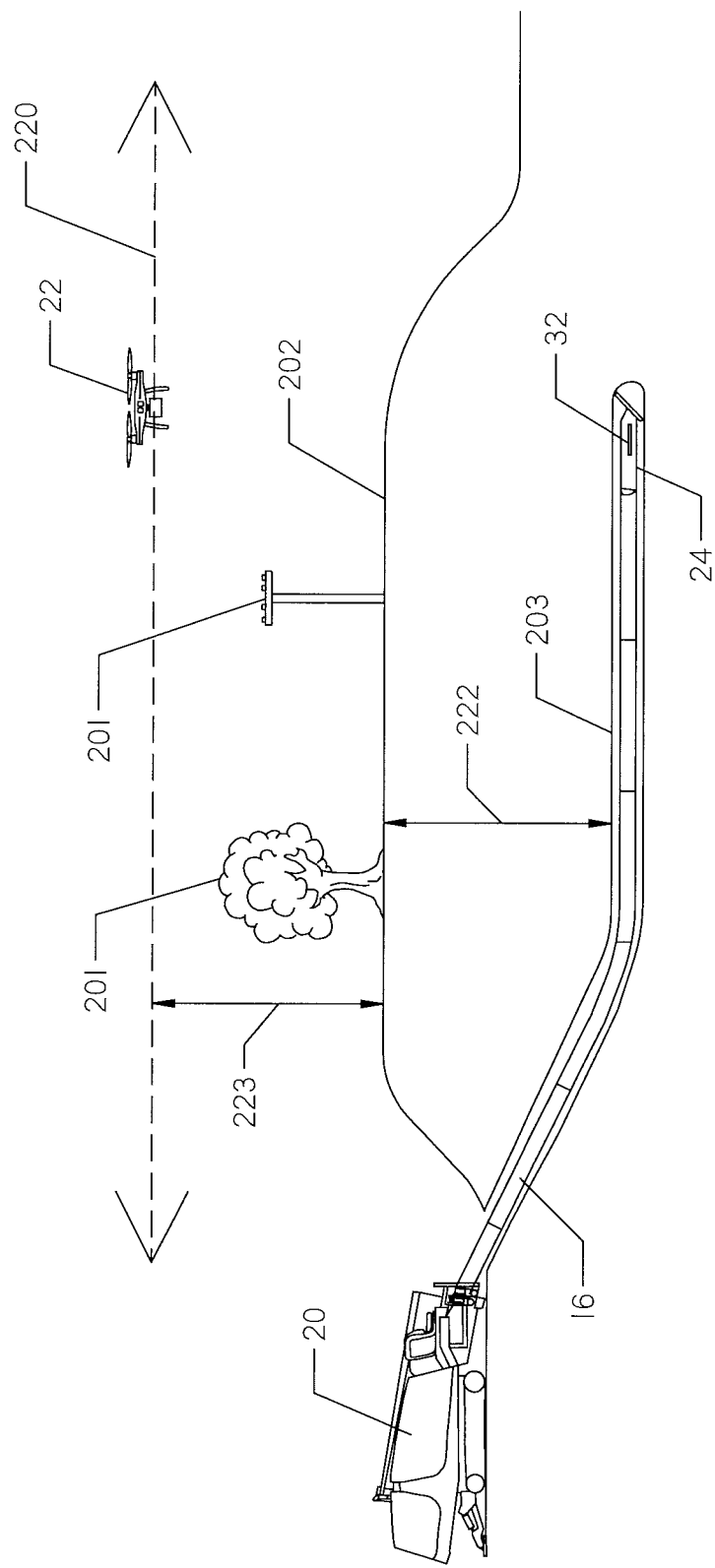
FIG. 8 is an overall plan view of a horizontal directional drilling operation using a tracker, showing a ground surface with a variable altitude and a tracker having a constant elevation.
Figure 9:
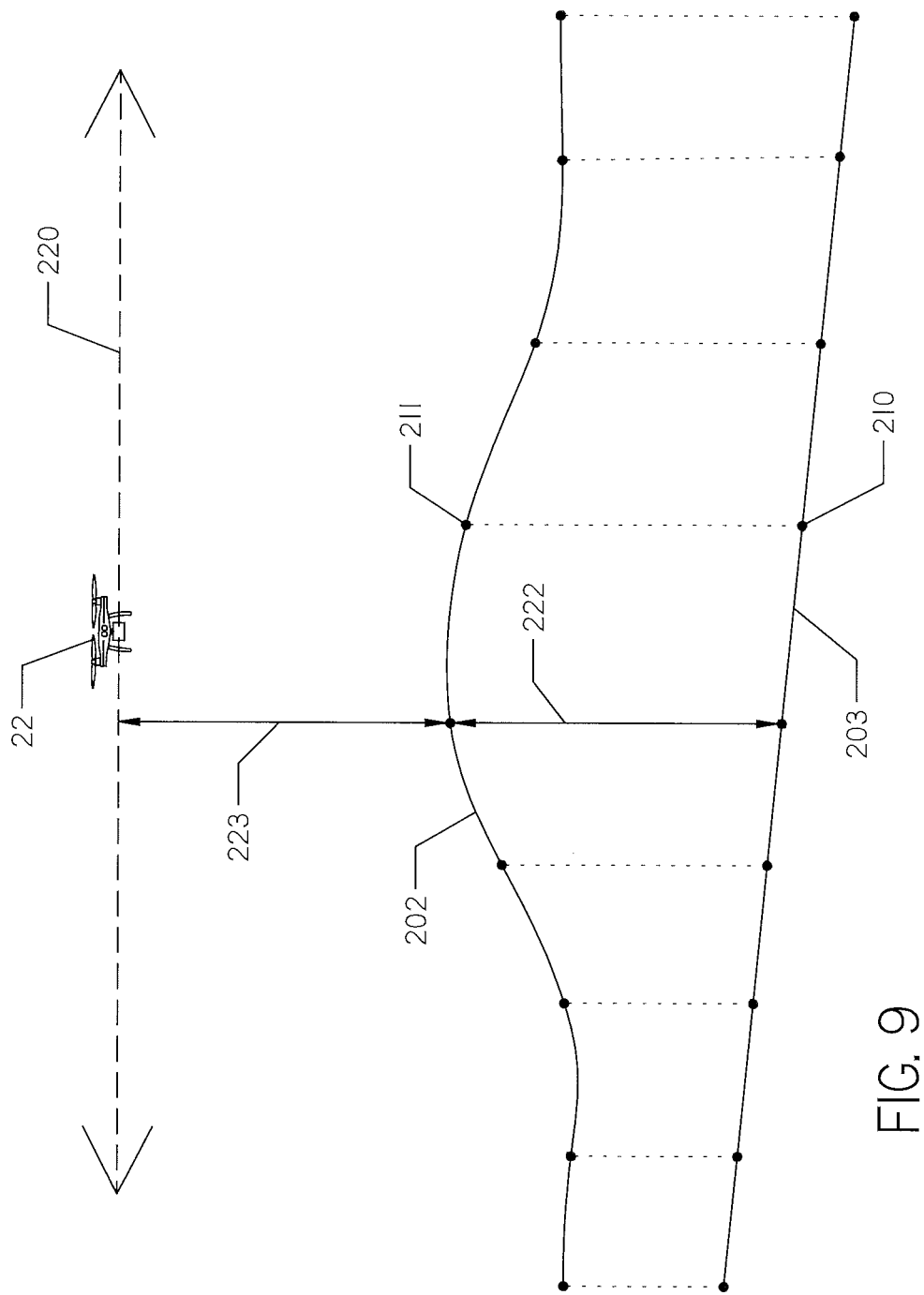
FIG. 9 is a side plan view of an underground utility, wherein the ground surface has a variable elevation and the tracker maintains a constant elevation.

In another embodiment, as illustrated in FIGS. 8-9, an absolute elevation (that is, the height above sea level) may be selected by an operator for the receiver 22. The altimeter 46 may include GPS location allowing the receiver's elevation above sea level, as well as local altitude above ground level, to be monitored. Additional sensors may detect obstructions 201, such as trees and power lines as shown in FIG. 8, which extend above ground level. As used herein, altitude refers to the distance above ground 202 level, while elevation refers to distance above the sea level of the Earth.

As shown in FIG. 9, a planned borepath 203 may extend under uneven ground 202 along a substantially constant grade. Such substantially constant grades are advantageous when planning utilities in which flow is gravity driven, such as sewer or stormwater utilities.

In order to plan the borepath 203, aerial tracker 22 may be programmed to conduct a pre-flight of the region to be bored. During the pre-flight the aerial receiver 22 may utilize onboard sensors 46 to detect and record ground 202 elevation as well as above ground obstacles 201 that may obstruct the aerial receiver along the borepath 203. Based on recorded elevation, altitude above the ground 202 and obstacles 201, the processor 38 may be configured to automatically pick the optimal elevation based on the lowest clear path. Alternatively, the operator may select the elevation on a user interface displaying the pre-flight results.

From the selected elevation the aerial receiver 22 will fly in a horizontal plane above the planned bore 12. The elevation of the aerial receiver 22 remains unchanged as it flies over varying terrain, as shown in FIG. 9. As ground elevation changes the altitude of the receiver 22 above the ground vary along the borepath 203. The selected elevation can be maintained by the aerial receiver 22 using an altimeter, GPS system, or other known methods in the art.

Since the aerial receiver 22 maintains a constant elevation, the depth of the transmitter 32, and thus the downhole tool 24 can be determined in relation to a constant reference plane 220. As shown, the reference plane 220 is a horizontal plane at a constant elevation. By using a horizontal plane for depth below the receiver 22, the slope between two underground waypoints 210 can be calculated without the need for considering the differences in ground elevation between the above ground reference points 211 directly above the waypoints 210. Alternatively, the reference plane 220 may have a slope between waypoints 210 which matches the desired slope of the borepath. In such a configuration, separate reference planes 220 may be utilized between each set of waypoints 210.

The underground depth 222 of the transmitter 32 may also be measured and recorded by the aerial receiver 22. The measured depth 222 is the detected vertical distance between the horizontal plane 220 and the beacon less the altitude 223, which is the distance between the aerial receiver 22 and the ground 202 level. Distance between the aerial receiver 22 and ground 202 level may be measured with a radar altimeter or other similar method.

Additionally, the aerial receiver 22 may be maintained at a constant vertical distance above the transmitter 32. Depth 222 may be determined in such a configuration by subtracting the receiver 22 altitude 223 from the vertical distance.

Alternatively, the aerial receiver 22 may be maintained at a constant vertical distance above the planned position of the transmitter 32 according to the borepath plan. Deviations from depth detected by the receiver 22 may be corrected through steering instructions.

It may be preferable to vary the elevation of the receiver 22 during the bore operation. For example, it may be necessary to increase elevation to re-establish radio communication with the HDD machine 20 or for obstacle 201 avoidance. Onboard sensors may detect either stationary or moving obstacles and require avoidance maneuvers. It may also be beneficial to lower elevation to increase or verify accuracy of the aerial receiver 22 or to periodically land the aerial receiver 22 to increase battery life. In any case, the aerial receiver 22 may return to the selected elevation to record depth from the selected reference frame.

Figure 5:
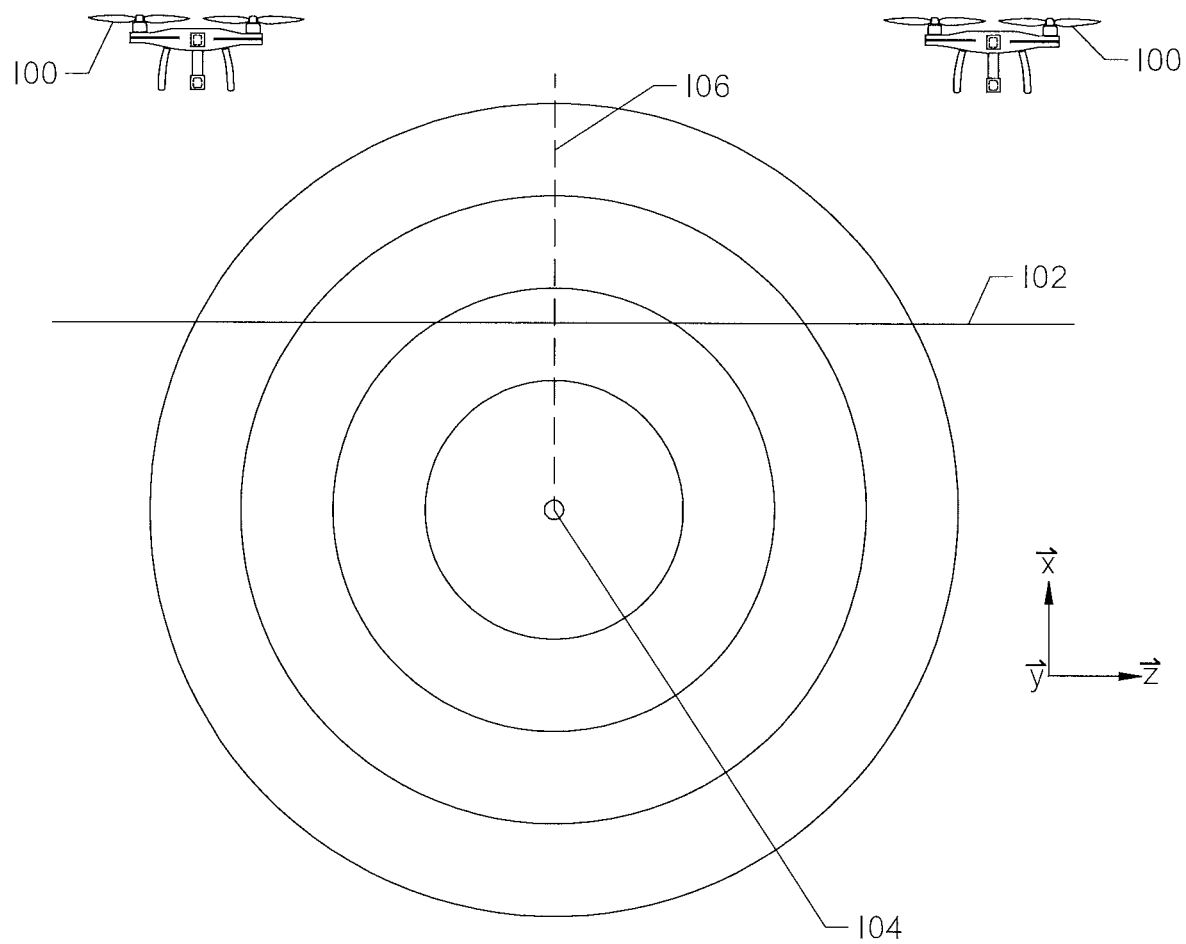
FIG. 5 is a plan view of a locator disposed above an underground utility emitting a magnetic field.

With reference now to FIG. 5, two alternative locating receivers 100 are shown. The receivers 100 are used above a surface of the ground 102 to locate an underground line or utility 104. The underground line 104 has a length and generates a magnetic field 106. The magnetic field 106 may be placed on the line directly as in U.S. Pat. No. 5,264,795, issued to Rider, et al., the contents of which are incorporated herein by reference.

Figure 7:
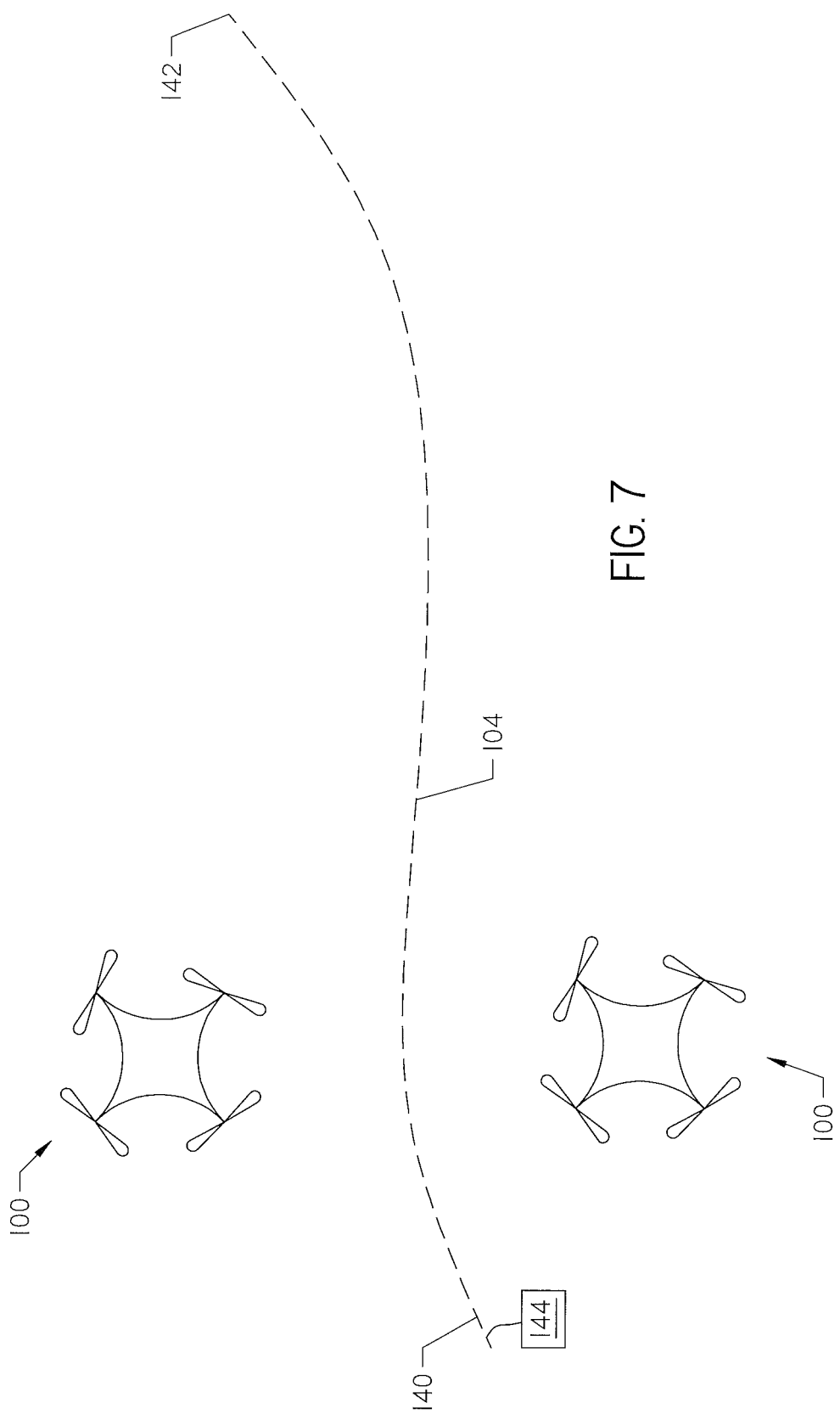
FIG. 7 is an overhead plan view of an underground utility.

As shown in FIG. 7, the underground line 104 extends from a first end 140 to a second end 142. A signal generator 144 places a signal frequency directly on the underground line 104 at its first end 140. Alternatively, the generator 144 may induce the signal on the underground line 104.

With reference again to FIG. 5, the field 106 generated around the underground line 104 is "cylindrical". This does not mean that the field 106 itself is a cylinder, but that it approximates a cylinder as it follows the often-curved length of the underground line 104. Therefore, the receivers 100 are located directly over the underground line 104 when the x component of the field 106, as shown in FIG. 5, is zero. The receivers 100 may have onboard sensors or GPS locators to determine the direct distance between them.

Depth of the underground line 104 below the ground 102 is determined by sensing the strength and/or shape of the magnetic field 106 and the height of the receiver 100 over ground level. It may be advantageous to periodically land the receivers 100 on the ground 102 to calibrate the altitude of the receivers above ground level.

Figure 6:
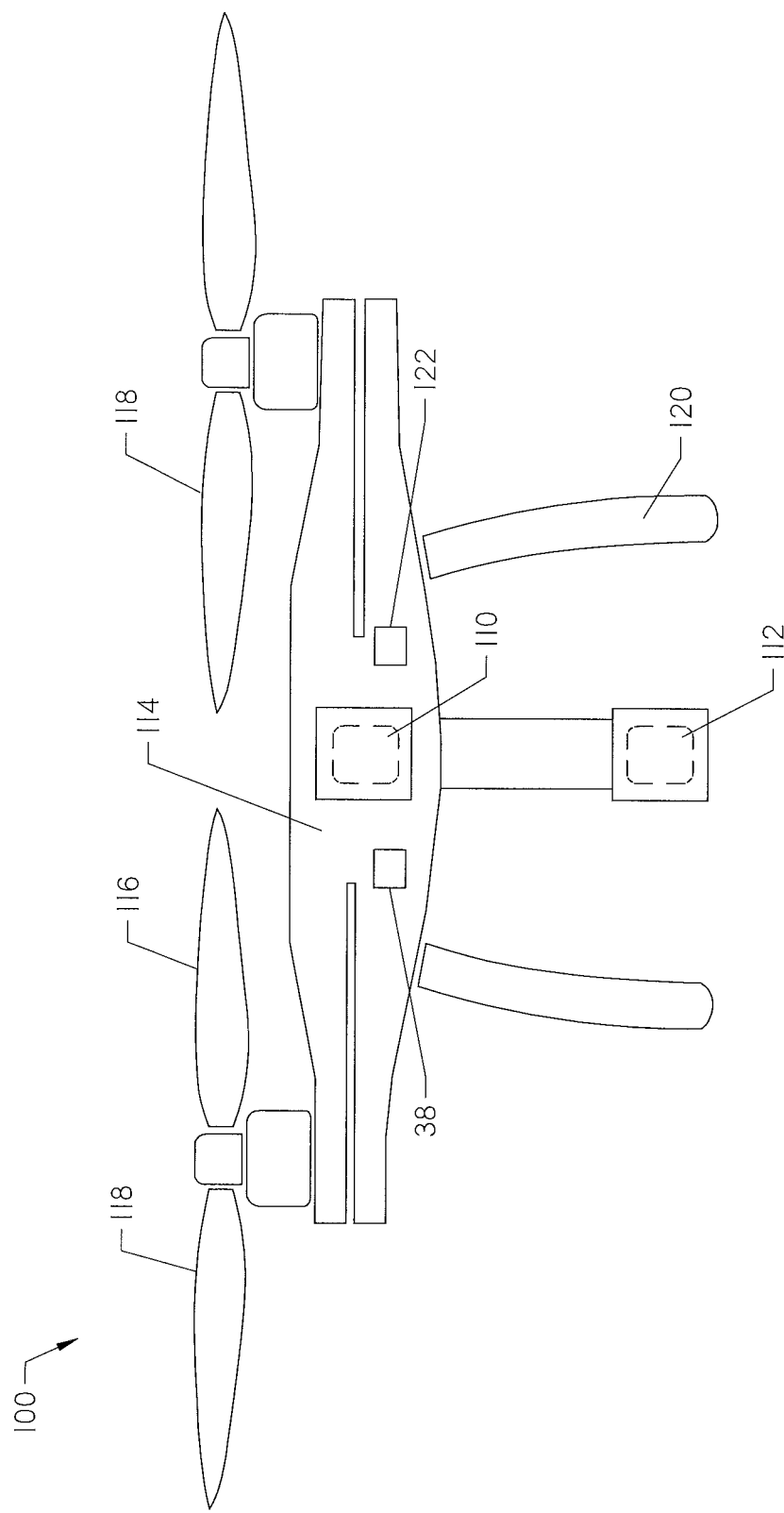
FIG. 6 is a diagrammatic representation of the locator of FIG. 5.

With reference now to FIG. 6, the receiver 100 is shown in more detail. The receiver 100 comprises a first antenna assembly 110 and a second antenna assembly 112. The first antenna assembly 110 is vertically displaced from the second antenna assembly 112. Various antennas may be used, including ferrite core, air core, and the antenna assembly described with reference to FIG. 3.

Continuing with FIG. 6, the receiver 100 further comprises a frame 114 and propulsion system 116 similar to that found on the receiver 22 of FIG. 2. Preferably, four rotors 118, such as those used in a "quad-copter" design are used to propel the frame 114. A pair of legs 120 are slightly further from the frame 114 than the second antenna assembly 112 such that when the receiver 100 is placed on the ground, the second antenna assembly is just off the ground.

Each antenna assembly 110, 112 is adapted to detect the total magnetic field emanating from the underground line 104 (FIG. 5). A processor 38 may be supported on the frame 114. The first 110 and second 112 antenna assemblies are a known distance apart, and make measurements based upon signal strength and magnetic field orientation measurements. Alternatively, the processor 38 may be remote from the frame 114. In either case, the antenna assemblies 110, 112 send an antenna signal to the processor 38, which uses the signal to generate a command signal.

Sensors 122, such as an altimeter, global positioning system (GPS) receiver, or other known devices, may determine the elevation of a reference point on the receiver 100 over the ground 102 (FIG. 5). This elevation may be subtracted from the distance between the reference point and the underground line, as measured by the antenna assemblies 110, 112.

A command signal may be generated by the processor 38 to cause the receiver 100 to move along the underground line 104, as indicated by the shape of the magnetic field. In this way, the path and depth of the underground line 104 may be mapped, even when the terrain directly above the line does not permit use of an on-ground locator.

Various modifications can be made in the design and operation of the present invention without departing from its spirit. Thus, while the principle preferred construction and modes of operation of the invention have been explained in what is now considered to represent its best embodiments, it should be understood that within the scope of the appended claims, the invention may be practiced otherwise than as specifically illustrated and described.

The invention claimed is:

1. A system for tracking a drill bit, the system comprising:
a drill rig;
a drill string having a first end and a second end, the first end is operatively connected to the drill rig;
a downhole tool connected to the second end of the drill string;
a dipole magnetic field transmitter supported by the downhole tool, in which a dipole magnetic field is emitted from the downhole tool at an underground location;
a drill bit connected to the downhole tool; and
a self-propelled autonomous receiver comprising:
an antenna to detect the dipole magnetic field; and
a processor, in which the processor is configured to:
maintain the self-propelled autonomous receiver in a reference plane above the ground;
receive a signal indicative of the field detected by the antenna;
determine a direction of a null within the dipole magnetic field; and
direct the self-propelled autonomous receiver to move along the reference plane to the null point;
in which the reference plane is at a constant elevation over mean sea level.

2. The system of claim 1, wherein the processor is configured to:
receive a signal indicative of the field detected by the antenna when at the null point; and
determine a vertical distance from the reference plane to the dipole magnetic field transmitter using the received signal.

3. The system of claim 1 in which the self-propelled autonomous receiver further comprises:
a positional sensor to detect the absolute position of the self-propelled autonomous receiver in three dimensions; and
a propulsion system configured to autonomously move to null field location in response to a command signal from the processor.

4. The system of claim 3 wherein the self-propelled autonomous receiver further comprises:
an altimeter.

5. The system of claim 3 in which the propulsion system comprises at least one helicopter rotor.

6. The system of claim 3 wherein the processor is further configured to:
detect the altitude of the self-propelled autonomous receiver and determine the actual depth of the transmitter below the ground using the altitude and the vertical distance.

7. A method of using the system of claim 1, in which the underground location is characterized as a first underground location, the method comprising:
determining the vertical distance from the reference plane to the dipole magnetic field transmitter using the signal received from the first underground location;
advancing the drill string and the downhole tool to a second underground location;
emitting a dipole magnetic field from the dipole magnetic field transmitter at the first underground location;
moving the self-propelled autonomous receiver to a null point of the magnetic field with the downhole tool at the second underground location; and
thereafter, determining a vertical distance from the reference plane to the dipole magnetic field transmitter at the second underground location using the received signal.

8. The method of claim 7 further comprising:
determining a slope of a reference line, the reference line extending from the first underground location to the second underground location, using the detected vertical distances at the first underground location and the second underground location.

9. The method of claim 7 further comprising the steps of:
providing a borepath plan comprising planned depths of the downhole tool;
determining the vertical distance between the reference plane and the dipole magnetic field transmitter;
simultaneously, detecting an altitude of the self-propelled autonomous receiver to determine an actual depth from the altitude of the self-propelled autonomous receiver above the ground and the vertical distance; and
comparing the actual depth with the borepath plan to generate a depth error value.

10. The method of claim 9 further comprising steering the drill string to provide corrections to the depth of the downhole tool in response to the generated depth error value.

11. A method comprising:
transmitting a dipole magnetic field from a transmitter at an underground location;
engaging a propulsion system to lift an autonomous receiver into the air to a predetermined reference elevation relative to mean sea level;
detecting the dipole magnetic field at the reference elevation using an antenna assembly disposed on the autonomous receiver;
moving the autonomous receiver with the propulsion system to a position above the transmitter and at a front null point of the magnetic field using the detected magnetic field while keeping the autonomous receiver at the predetermined reference elevation;
thereafter, measuring the signal strength of the magnetic field and the orientation of the magnetic field in three dimensions using the antenna assembly with the autonomous receiver at the null point to determine a vertical distance between the transmitter and the autonomous receiver;
detecting an altitude of the autonomous receiver above a ground surface; and
thereafter, determining an actual depth of the underground location using the altitude and the vertical distance.

12. The method of claim 11 in which the autonomous receiver is characterized as a first autonomous receiver, and further comprising:
engaging a propulsion system to lift a second autonomous receiver in the air to a predetermined reference elevation;
detecting the dipole magnetic field at the reference elevation using an antenna assembly disposed on the second autonomous receiver;
moving the second autonomous receiver to a position above the transmitter and at a rear null point of the magnetic field using the detected magnetic field while keeping the second autonomous receiver at the predetermined reference elevation.

13. The method of claim 12 further comprising:
determining a distance between the first autonomous receiver and the second autonomous receiver; and
determining a depth of the transmitter below the reference elevation on the distance between the first autonomous receiver and the second autonomous receiver;
moving the transmitter; and
automatically moving the first autonomous receiver with the front null point and the second autonomous receiver with the back null point as the transmitter is moved.

14. The method of claim 11 in which the transmitter is disposed at a downhole tool located at a distal end of a drill string.

15. A method, comprising:
providing a borepath plan comprising planned depths of the downhole tool at a series of underground waypoints;
determining the vertical distance between the reference elevation and the transmitter at at least one waypoint;
simultaneously, detecting an altitude of the autonomous receiver to determine an actual depth using the altitude of the autonomous receiver above the ground and the vertical distance;
after the preceding steps, performing the steps of claim 12; and
thereafter, comparing the actual depth with the planned depth to generate a depth error value.

16. The method of claim 11, further comprising:
prior to transmitting the magnetic field:
flying the autonomous receiver to above a ground region above the site of a planned below-ground borepath;
detecting obstacles above the ground region with the autonomous receiver; and
thereafter, choosing the reference elevation based on a position of the planned below-ground borepath as compared to the detected obstacles.

17. The method of claim 11, wherein the step of moving the autonomous receiver with the propulsion system to a position above the transmitter and at a front null point of the magnetic field using the detected magnetic field further comprises:
moving the autonomous receiver to the null point at the reference elevation.

18. The method of claim 11, wherein the step of moving the autonomous receiver with the propulsion system to a position above the transmitter and at a front null point of the magnetic field using the detected magnetic field further comprises:
moving the autonomous receiver to the null point below the reference elevation.

19. A system comprising:
a signal transmitter disposed at an underground location to generate a dipole magnetic field from the underground location; and
a self-propelled autonomous receiver comprising:
an antenna assembly to detect the magnetic field and generate an antenna signal;
a processor programmed to receive the antenna signal and generate a command signal; and
a propulsion system to receive the command signal and move the receiver to a position above the transmitter and at a front null point of the magnetic field using the detected magnetic field while keeping the receiver at a predetermined reference elevation above mean sea level.

* * * * *